United States Patent Office 3,021,341
Patented Feb. 13, 1962

3,021,341
METHYLENE DIOXANES
Willard J. Croxall and Norman D. Dawson, Elkhart, Ind., assignors to Miles Laboratories, Inc., Elkhart, Ind., a corporation of Indiana
No Drawing. Filed Feb. 23, 1960, Ser. No. 10,022
8 Claims. (Cl. 260—340.6)

This invention relates to new and useful heterocyclic compounds and to methods for their preparation. More specifically, the present invention pertains to substituted dioxanes corresponding to the following general formula:

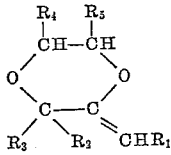

wherein $R_1$ is hydrogen, lower alkyl, lower alkenyl or a phenyl group; $R_2$ to $R_5$ are hydrogen, lower alkyl or phenyl groups provided that $R_2$ and $R_3$ are not both hydrogens. Representative examples of this class of compounds are: 2-methylene-3,3-dimethyl-1,4-dioxane, 2-methylene-3-n-propyl-1,4-dioxane, 2-methylene-3-methyl-3-ethyl-1,4-dioxane.

The compounds of this invention can be conveniently formed by refluxing an appropriate alkynyl β-hydroxyethyl ether of the general formula

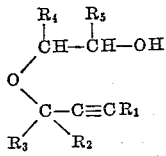

wherein $R_1$ to $R_5$ are as indicated above, with potassium hydroxide in an organic solvent, such as xylene, toluene, Decalin, dibutyl Carbitol, dibutyl Cellosolve, etc. In consequence of this treatment, the alkynyl ethers are cyclized to yield substituted dioxanes of the formula given hereinabove.

The alkynyl β-hydroxyethyl ethers used in this reaction can be prepared by reacting commercially available substituted acetylenically unsaturated alcohols, 1-alkyn-3-ols, with lower alkylene oxides, such as ethylene oxide, propylene oxide or butylene oxide or the like in the presence of born fluoride ($BF_3$) as a catalyst. This condensation reaction can be represented graphically by the following equation:

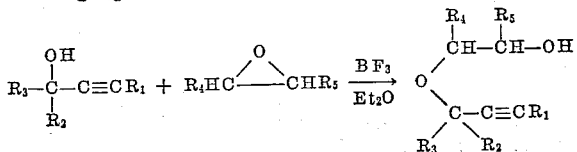

wherein $R_1$ to $R_5$ have the significance ascribed to them above.

An alternate method of synthesis of the starting materials contemplates the use of lower alkylene chlorohydrins in the presence of potassium hydroxide in accordance with the following equation:

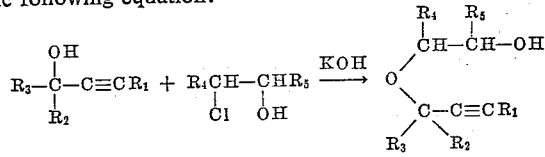

wherein $R_1$ to $R_5$ are as indicated hereinabove. This alternate method is described in greater detail by the following example:

EXAMPLE I

*Preparation of 3-(β-hydroxyethoxy)-1-propyne by alternate method*

Propargyl alcohol (1-propyn-3-ol) (200 gms., 3.58 moles) was cooled to 10° C. and 56 gms. (1.0 mole) of KOH was added in portions. After solution of the KOH, ethylene chlorohydrin (56 gms., 1.0 mole) was added dropwise at a low temperature (8–14° C.). The ice bath was removed and the mixture warmed slowly. Potassium chloride separated as the temperature increased. After one hour at 70–80° C., the mixture was cooled to 20° C. and filtered. The clear filtrate was distilled under water pump vacuum using a ten-inch column. The excess propargyl alcohol was removed at 25–30° C./12–14 mm. The product was collected at 75–80° C./12–14 mm. Yield, 60–70 gm. (60–70%); refractive index, $n_D^{25}$ 1.4508.

However, where both $R_2$ and $R_3$ in the formula for 3-alkyn-3-ol are alkyl substituents, i.e. with a tertiary alkynyl alcohol it is necessary to use potassium butoxide rather than KOH as condensing agent.

The compounds of this invention are valuable due to their capability to polymerize or copolymerize with other polymerizable monomers to form polymers or copolymers having utility as adhesive materials, protective coatings and the like. More specifically, for example, when catalyzed with a small amount of boron fluoride, these 2-methylene dioxanes polymerize readily.

These compounds are further useful as intermediates. For instance, upon hydrogenation (see examples) compounds are obtained having utility as specialty solvents for many organic compounds. It is evident that these compounds also undergo halogenation, particularly bromination and chlorination, and other addition reactions typical of unsaturated compounds.

The following examples will illustrate the various compounds within the purview of this invention and the methods of their preparation. Particularly, the following example, Example II, illustrates in great detail the process of making 2-methylene-3,3-dimethyl-1,4-dioxane as a representative compound. These examples are given for purposes of illustration only. It is to be understood that this invention is not limited to the exact disclosure.

EXAMPLE II

*2-methylene-3, 3-dimethyl-1,4-dioxane*

PREPARATION OF 3-(β-HYDROXYETHOXY)-3-METHYL-1-BUTYNE

Into a three liter flask was charged 620.4 gms. (7.38 moles) of methylbutynol (3 - methyl - 1 - butyn-3-ol) Three ml. of 3% $BF_3$ in ether was added as a catalyst and the ethylene oxide bubbled in at a slow rate. The temperature of the reaction mixture was maintained at 25–30° C. with an ice bath. The ethylene oxide uptake was 63 gms. (1.43 moles) in one hour. The reaction mixture was adjusted to pH 7 with solid sodium methoxide and the unreacted methyl butynol recovered by distillation at atmospheric pressure (547 gms.). The remaining liquid was distilled rapidly and collected at 70–120° C./14 mm. Hg. This, in turn, was fractionated through a 12-inch column packed with stainless steel saddles. The desired compound, 3 - (β-hydroxyethoxy)-3-methyl-1-butyne, was collected at 80–81° C./20 mm. Hg. The yield was 58.3 gms. (52%) based on ethylene oxide and the refractive index ($n_D^{25}$), 1.4405.

PREPARATION OF 2-METHYLENE-3,3-DIMETHYL-1,4-DIOXANE

A 500 ml. flask equipped with stirrer, thermometer, dropping funnel and distilling condenser was charged with 175 ml. of Decalin and 10 gms. of solid potassium hydroxide. This mixture was heated to 170–175° C. and the above propargyl β-hydroxyethyl ether added dropwise. As the cyclic compound formed, it vaporized, distilling from the reaction mixture and was collected in a receiver. The cyclized material was fractionated through a 12-inch column. The 2-methylene-3,3-dimethyl-1,4-dioxane was collected at 136–140° C. The yield was 18.5 gms. (35%). and the refractive index ($n_D^{25}$), 1.4480.

REDUCTION OF 2-METHYLENE-3,3-DIMETHYL-1,4-DIOXANE

The above 2-methylene dioxane (16.3 g., 0.127 mole) was dissolved in 100 ml. of tetrahydrofuran and a small amount of platinum oxide catalyst added. The mixture was shaken on the Parr apparatus at an initial hydrogen pressure of 51 p.s.i. Hydrogen uptake began immediately and nine pounds of the theoretical ten pounds was absorbed in thirty minutes. The final pound required an additional two hours and fifteen minutes. The hydrogenation mixture was filtered to remove the catalyst and the filtrate distilled. The solvent, tetrahydrofuran, was recovered, leaving a yellow oil. This oil was distilled and a clear liquid collected at 142–145° C. The yield of 2-methyl-3,3-dimethyl-1,4-dioxane was 10 g. (61.5%) and the refractive index ($n_D^{25}$), 1.4326.

In accordance with the above process description other propargyl β-hydroxyethyl ethers were prepared and cyclized as follows:

EXAMPLE III

*2-methylene-3-n-propyl-1,4-dioxane*

1-hexyne-3-ol was reacted with ethylene oxide to yield 3-(β-hydroxyethoxy)-1-hexyne with a B.P. of 94–95° C./14 mm. Hg and a refractive index ($n_D^{25}$) of 1.4455.

The cyclization of this product was carried out in toluene, giving 2-methylene-3-n-propyl-1,4-dioxane, having a B.P. of 62–63° C./14 mm. Hg and a refractive index ($n_D^{25}$) of 1.4484. Yield, 61.5% of the theoretical amount based on the starting material.

This compound was reduced by catalytic hydrogenation in methanol, yielding 2-methyl-3-n-propyl-1,4-dioxane with a B.P. of 61–62° C. and a refractive index ($n_D^{25}$) of 1.4432. Yield, 73%.

EXAMPLE IV

*2-methylene-3-methyl-3-ethyl-1,4-dioxane*

3-methyl-1-pentyn-3-ol was reacted with ethylene oxide yielding 3-(β-hydroxyethoxy)-3-methyl-1-pentyne with a B.P. of 89–92° C./16 mm. Hg and a refractive index ($n_D^{25}$) of 1.4447.

This propargyl β-hydroxyethyl ether was cyclized in dibutyl Carbitol yielding 57.5% of 2-methylene-3-methyl-3-ethyl-1,4-dioxane with a B.P. of 57–58° C./14 mm. Hg and a refractive index ($n_D^{25}$) of 1.4522.

In tetrahydrofuran this compound was quantitatively hydrogenated to 2,3-dimethyl-3-ethyl-1,4-dioxane with a B.P. of 57–58° C./14 mm. Hg and a refractive index ($n_D^{25}$) of 1.4368.

Likewise, 1-butyn-3-ol and 3,5-dimethyl-1-hexyn-3-ol were reacted with ethylene oxide yielding, respectively, 3-(β-hydroxyethoxy)-1-butyne with a B.P. of 74–76° C./14 mm. Hg and a refractive index ($n_D^{25}$) of 1.4413 and 3-(β-hydroxyethoxy)-3,5-dimethyl-1-hexyne with a B.P. of 91–127° C./14 mm. Hg and a refractive index ($n_D^{25}$) of 1.4455. These alkynyl β-hydroxyethyl ethers were then cyclized to give 2-methylene-3-methyl-1,4-dioxane and 2-methylene-3-methyl-3-isobutyl-1,4-dioxane, respectively.

PROOF OF STRUCTURE

Alkynyl β-hydroxyethyl ethers which are monosubstituted or disubstituted in the 3-position, e.g. 3-(β-hydroxyethoxy)-1-hexyne and 3-(β-hydroxyethoxy)-3-methyl-1-butyne yielded, respectively, as shown above, 2-methylene-3-n-propyl-1,4-dioxane and 2-methylene-3,3-dimethyl-1,4-dioxane which on catalytic hydrogenation absorbed the theoretical amount of hydrogen to give 2-methyl-3-n-propyl-1,4-dioxane and 2,3,3-trimethyl-1,4-dioxane.

Nuclear magnetic resonance studies were conducted on 2-methylene - 3,3 - dimethyl - 1,4 - dioxane and 2,3,3-trimethyl-1,4-dioxane. The findings proved conclusively that compounds having the structure of a 1,4-dioxane were indeed formed in consequence of the treatment described above. Furthermore, analytical data also point to the structure of a 1,4-dioxane.

What is claimed is:

1. A substituted heterocyclic compound having the formula:

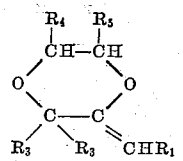

wherein $R_1$ is selected from the group consisting of hydrogen, lower alkyl, lower alkenyl and phenyl and $R_2$, $R_3$, $R_4$ and $R_5$ are selected from the group consisting of hydrogen, lower alkyl and phenyl, provided that $R_2$ and $R_3$ are not both hydrogens.

2. 2-methylene-3,3-dimethyl-1,4-dioxane.
3. 2-methylene-3-methyl-3-ethyl-1,4-dioxane.
4. 2-methylene-3-n-propyl-1,4-dioxane.
5. The method of producing a substituted heterocyclic compound having the formula

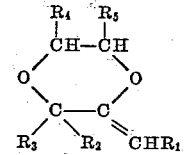

wherein $R_1$ is selected from the group consisting of hydrogen, lower alkyl, lower alkenyl and phenyl, and $R_2$, $R_3$, $R_4$ and $R_5$ are selected from the group consisting of hydrogen, lower alkyl and phenyl, provided that $R_2$ and $R_3$ are not both hydrogen, which comprises heating at a temperature of from 100° C. to 200° C. a compound of the formula

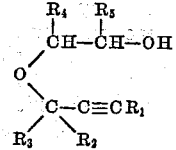

wherein $R_1$, $R_2$, $R_3$, $R_4$ and $R_5$ are as indicated hereinbefore, with potassium hydroxide in an organic solvent and taking off overhead the desired compound.

6. The method of producing 2-methylene-3,3-dimethyl-1,4-dioxane which comprises heating at a temperature of from 170° C. to 175° C. 3-(β-hydroxyethoxy)-3-methyl-1-butyne with potassium hydroxide in an organic solvent and taking off overhead 2-methylene-3,3-dimethyl-1,4-dioxane.

7. The method of producing 2-methylene-3-n-propyl-1,4-dioxane which comprises heating at a temperature of from 170° C. to 175° C. 3-(β-hydroxyethoxy)-1-hexyne with potassium hydroxide in an organic solvent and taking off overhead 2-methylene-3-n-propyl-1,4-dioxane.

8. The method of producing 2-methylene-3-methyl-3-ethyl-1,4-dioxane which comprises heating at a temperature of from 170° C. to 175° C. 3-(β-hydroxyethoxy)-3-methyl-1-pentyne with potassium hydroxide in an organic solvent and taking off overhead 2-methylene-3-ethyl-1,4-dioxane.

References Cited in the file of this patent

Summerbell et al.: J. Am. Chem. Soc., vol. 79, pages 6219–21 (1957).